United States Patent
Jocha et al.

(10) Patent No.: US 8,964,569 B2
(45) Date of Patent: Feb. 24, 2015

(54) GENERIC MONITORING PACKET HANDLING MECHANISM FOR OPENFLOW 1.1

(75) Inventors: David Jocha, Budapest (HU); Andras Kern, Budapest (HU)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 333 days.

(21) Appl. No.: 13/275,149

(22) Filed: Oct. 17, 2011

(65) Prior Publication Data
US 2013/0010605 A1 Jan. 10, 2013

Related U.S. Application Data

(60) Provisional application No. 61/504,267, filed on Jul. 4, 2011.

(51) Int. Cl.
*H04J 3/14* (2006.01)
*H04L 12/26* (2006.01)
*H04L 12/939* (2013.01)

(52) U.S. Cl.
CPC .............. *H04L 43/026* (2013.01); *H04L 43/12* (2013.01); *H04L 49/555* (2013.01); *Y02B 60/33* (2013.01)
USPC ...................................................... 370/241.1

(58) Field of Classification Search
None
See application file for complete search history.

(56) References Cited

U.S. PATENT DOCUMENTS

| 8,477,614 | B2 | 7/2013 | Wiley et al. | |
| 2008/0101241 | A1* | 5/2008 | Mohan et al. | 370/236.2 |
| 2011/0188373 | A1 | 8/2011 | Saito | |
| 2011/0231545 | A1 | 9/2011 | Enomoto et al. | |
| 2011/0286324 | A1* | 11/2011 | Bellagamba et al. | 370/219 |
| 2013/0007252 | A1* | 1/2013 | Welin et al. | 709/223 |

FOREIGN PATENT DOCUMENTS

WO WO-2010064532 6/2010

OTHER PUBLICATIONS

*IEEE Standard for Local and metropolitan area networks*; Amendment 5: Connectivity Fault Management; Dec. 17, 2007; 260 pages.
I. Busi, et al.; *MPLS-TP OAM based on Y.1731* draft-bhh-mpls-tp-oam-y1731-06.txt; Oct. 25, 2010; 30 pages.
(Continued)

*Primary Examiner* — Dang Ton
*Assistant Examiner* — Ronald H Davis
(74) *Attorney, Agent, or Firm* — Blakely, Sokoloff, Taylor & Zafman, LLP (57) ABSTRACT

A method implemented by a network element monitor OpenFlow data flows and enable operations, administration and management (OAM) functionality in OpenFlow. The method inserts OpenFlow OAM packets into an OpenFlow data flow to monitor the OpenFlow data flow, wherein inserted OpenFlow OAM packets have fate sharing with data packets in the OpenFlow data flow. The method comprises the steps of receiving by the network element the OpenFlow OAM packets from a source through a port of the network element, matching by an OpenFlow switch module using a matching structure of OpenFlow data packets received by the network element to identify the OpenFlow OAM packets, and forwarding the identified OpenFlow OAM packets to a flow table or group table of the OpenFlow switch module to aggregate the OpenFlow OAM packets with a corresponding OpenFlow data flow.

12 Claims, 7 Drawing Sheets

(56) References Cited

OTHER PUBLICATIONS

Allan; *Proactive Connectivity Verification, Continuity Check and Remote Defect indication for MPLS Transport Profile* draft-ietf-mpls-tp-cc-rdi-05; Jun. 2011; 23 pages.

I. Busi, et al.; *Operations, Administration and Maintenance Framework for MPLS-based Transport Networks* draft-ietf-mpls-tp-oam-framework-11.txt; Feb. 11, 2011, 66 pages.

M. Vigoureux, et al.; *Requirements for Operations, Administration, and Maintenance (OAM) in MPLS Transport Networks*; May 2010, 18 pages.

ITU-T; *OAM functions and mechanisms for Ethernet based networks*; Feb. 2008; 82 pages.

*OpenFlow Switch Specification*; Version 1.1.0 Implemented (Wire Protocol 0x02); Feb. 28, 2011; 56 pages.

IEEE 1588-2002 "*Standard for a Precision Clock Synchronization Protocol for Networked Measurement and Control Systems*"; Nov. 8, 2002, 154 pages.

Non final Office Action dated Sep. 26, 2013, U.S. Appl. No. 13/279,018; 15 pages.

Final Office Action, U.S. Appl. No. 13/279,018, dated Mar. 5, 2014, 17 pages.

Non-Final Office Action, U.S. Appl. No. 13/279,018, dated Jun. 18, 2014, 21 pages.

Notice of Allowance, U.S. Appl. No. 13/279,018, dated Oct. 17, 2014, 6 pages.

* cited by examiner

| VERSION | TYPE | LENGTH (16bits) |
|---|---|---|
| XID (32bits) | | |
| Incoming port ID (32bits) | | |
| Table Index (32bits) | | |
| Group Entry Id (32bits) | | |
| Meta-data (64bits) | | |
| Packet to be injected (LENGTH - 24 octets) | | |

FIG. 5

| TYPE (16bits) | LENGTH = 20 (16bits) |
|---|---|
| Table Index (32bits) | |
| Group Entry Id (32bits) | |
| Meta-data (64bits) | |

GENERIC MONITORING PACKET HANDLING MECHANISM FOR OPENFLOW 1.1

CROSS-REFERENCE TO RELATED APPLICATION

The present application claims priority from U.S. provisional patent application 61/504,267 titled GENERIC MONITORING PACKET HANDLING MECHANISM FOR OPENFLOW 1.1, filed Jul. 4, 2011.

FIELD OF THE INVENTION

The embodiments of the invention are related to the implementation of operations, administration and management (OAM) functions for OpenFlow. Specifically, the embodiments of the invention relate to a method and system for identifying, inserting and de-multiplexing OpenFlow OAM packets while ensuring fate sharing for these OpenFlow OAM packets in relation to the monitored OpenFlow data flows.

BACKGROUND

Unlike the traditional network architecture, which integrates both the forwarding (data) and the control planes in the same box (network element), a split architecture network decouples these two planes and executes the control plane on servers that might be in different physical locations from the forwarding elements (switches). The use of a split architecture in a network enables the simplification of the switches implementing the forwarding plane and shifts the intelligence of the network into a number of controllers that oversee the switches.

The tight coupling of the forwarding and control planes in a traditional architecture usually results in an overly complicated control plane and complex network management. This is known to create a large burden and high barrier to new protocols and technology developments. Despite the rapid improvement of line speeds, port densities, and performance, the network control plane mechanisms have advanced at a much slower pace than the forwarding plane mechanisms.

In a split architecture network, controllers collect information from switches, and compute and distribute the appropriate forwarding decisions to switches. Controllers and switches use a protocol to communicate and exchange information. An example of such protocol is OpenFlow (see www.openflow.org), which provides an open and standard method for a switch to communicate with a controller, and it has drawn significant interest from both academics and industry.

SUMMARY

A method implemented by a network element monitor OpenFlow data flows and enable operations, administration and management (OAM) functionality in OpenFlow. The method inserts OpenFlow OAM packets into an OpenFlow data flow to monitor the OpenFlow data flow, wherein inserted OpenFlow OAM packets have fate sharing with data packets in the OpenFlow data flow. The method comprises the steps of receiving by the network element the OpenFlow OAM packets from a source through a port of the network element matching by an OpenFlow switch module using a matching structure of OpenFlow data packets received by the network element to identify the OpenFlow OAM packets, and forwarding the identified OpenFlow OAM packets to a flow table or group table of the OpenFlow switch module to aggregate the OpenFlow OAM packets with a corresponding OpenFlow data flow.

A network element monitors OpenFlow data flows and enable operations, administration and management (OAM) functionality in OpenFlow. The network element to insert OpenFlow OAM packets into an OpenFlow data flow to monitor the OpenFlow data flow wherein inserted OpenFlow OAM packets have fate sharing with data packets in the OpenFlow data flow. The network element comprising an incoming physical port to receive OpenFlow data packets from a source node over a first network connection, an outgoing physical port to transmit OpenFlow data packets to a destination node over a second network connection, a network processor connected to the incoming physical port and the outgoing physical port, the network processor executing an OpenFlow switch module. The OpenFlow switch module to match a matching structure in OpenFlow data packets to identify the OpenFlow OAM packets, to forward the identified OpenFlow OAM packets to a flow table or group table of the OpenFlow switch module to aggregate the OpenFlow OAM packets with a corresponding OpenFlow data flow, and to forward the OpenFlow data flow to the destination node through the outgoing physical port.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to affect such feature, structure, or characteristic in connection with other embodiments whether or not explicitly described.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

The techniques shown in the figures can be implemented using code and data stored and executed on one or more electronic devices (e.g., an end station, a network element, server or similar electronic devices). Such electronic devices store and communicate (internally and/or with other electronic devices over a network) code and data using non-transitory machine-readable or computer-readable media, such as non-transitory machine-readable or computer-readable storage media (e.g., magnetic disks; optical disks; random access memory; read only memory; flash memory devices; and phase-change memory). In addition, such electronic devices typically include a set of one or more processors coupled to one or more other components, such as one or more storage devices, user input/output devices (e.g., a keyboard, a touch screen, and/or a display), and network connections. The coupling of the set of processors and other components is typically through one or more busses and bridges (also termed as bus controllers). The storage devices represent one or more non-transitory machine-readable or computer-readable storage media and non-transitory machine-readable or computer-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, or similar networking device.) is a piece of networking equipment, including hardware and software that communicatively interconnects other equipment on the network (e.g., other network elements, end stations, or similar networking devices). Some network elements are "multiple services network elements" that provide support for multiple networking functions (e.g., routing, bridging, switching, Layer 2 aggregation, session border control, multicasting, and/or subscriber management), and/or provide support for multiple application services (e.g., data collection).

In the following description and claims, the terms 'coupled' and 'connected,' along with their derivatives, may be used. It should be understood that these terms are not intended as synonyms for each other. 'Coupled' is used to indicate that two or more elements, which may or may not be in direct physical or electrical contact with each other, co-operate or interact with each other. 'Connected' is used to indicate the establishment of communication between two or more elements that are coupled with each other.

The embodiments of the invention provide a method and system for avoiding the disadvantages of the prior art. Most data plane technologies, such as Ethernet or multi-protocol label switching (MPLS), used in combination with OpenFlow have defined OAM solutions that are specific to these technologies. The OAM solutions defined by these data plane technologies provide a mechanism to identify, inject, and de-multiplex the OAM packets into/from a data flow. Also these OAM solutions ensure correct fate sharing for OAM packets where the OAM packets are forwarded in the same manner that the service packets are forwarded through a network. However, OpenFlow does not provide support for any mechanism that enables OAM packet identification, injecting or de-multiplexing. This makes the implementation of any OAM solution in an OpenFlow domain impossible. Implementing fate sharing for an OAM technology to be used in OpenFlow requires special consideration about the identification of OAM packets that is not supported by the OpenFlow 1.1 specification.

The embodiments of the invention overcome these disadvantages of the prior art. The embodiments of the invention. The embodiments of the invention provide a process and systems for enabling OAM packets (i.e., tagged frames) to be inserted into an OpenFlow data flow, and to be de-multiplexed from the OpenFlow data flow. The process and system support fate sharing for the OpenFlow OAM packets that ensures the OpenFlow OAM packets take the same path through a network between the source and destination of the data flow as the other data packets of the data flow (i.e., data stream). To distinguish the OpenFlow OAM packets (i.e., tagged frames) from other OpenFlow data packets a matching field that is not taken into account during matching for the handling of the OpenFlow data packets is utilized to identify the OAM packets. A non-allocated value of the selected field's domain is used to identify the OAM packets (tagged frames). To insert the OAM packets (tagged frames) into any stage of the packet processing pipeline, a new logical module is added to the OpenFlow switch module. The new logical module is referred to herein as the 'Packet Inject Logic' (PIL). Two example implementation options are described herein. In the first example implementation, the PIL is configured to manage the injection of the OAM packets (tagged frames) on per-packet basis; in the second example embodiment, the PIL receives instructions directing the injection of the OAM packet (tagged frame) from other switch modules of the network element through meta data attached to the OAM packet. In other example embodiments, the de-multiplex process distinguishes between the OpenFlow data packets and the OpenFlow OAM packets (tagged frames) using an in-switch and/or a controller termination option. The OpenFlow protocol is extended in order to support the remote instruction of the PIL related to the identification, injection and de-multiplexing of the OpenFlow OAM packets.

OpenFlow Architecture

Figure 1:
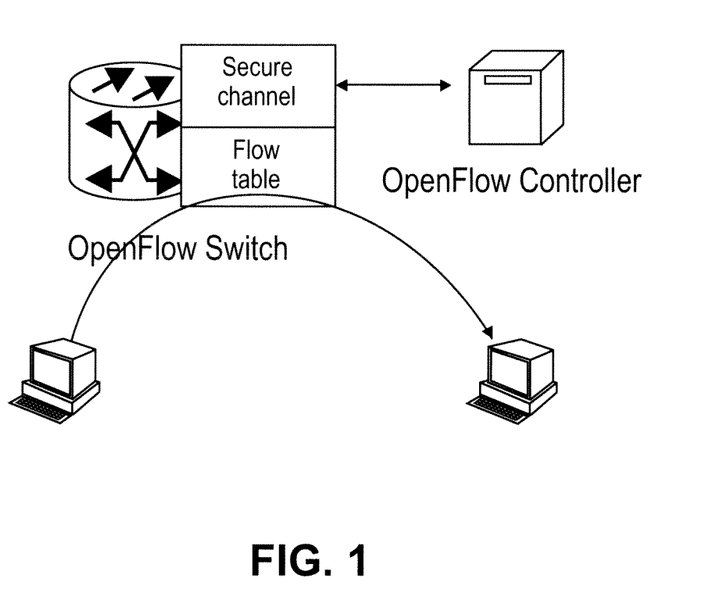
FIG. 1 is a diagram of one embodiment of an example architecture for a simple OpenFlow network.

FIG. 1 is a diagram showing an overview of the OpenFlow interface between a switch and a controller. OpenFlow defines a logical switch model, which includes defining packet forwarding and processing functions of the logical switch making use of a generic table-based model in the form of a flow table to create a packet processing pipeline. The tables defined in this table model comprise rows where each row describes a packet handling alternative with three fields: rules, actions and counters. The rules specify the circumstances under which the actions are to be executed. In each instance where the actions are applied, the corresponding counter is updated.

In the OpenFlow 1.1 specification, two table types, the flow table and the group table, have been defined. In a flow table the rule field contains a vector of attributes from the header. This vector contains variables of the Ethernet, the MPLS, the IP and the TCP/UDP headers. The rule of the group table is an index identifying the action in a list of actions to be executed for the packet. The group table thereby supports complex actions such as multicast and protection.

The packet processing pipeline is formed by a sequence of flow tables followed by one group table. Any packet entering the switch is automatically processed according to the first flow table. As a result of matching the packet in the first flow table, the packet can be updated, sent out through a port or sent for further processing to a subsequent table. Meta data can be assigned to the packet during processing in each flow table and passed to the subsequent tables. If the packet is sent to a subsequent table, it will then be processed according to that flow table. The packet can be processed by each table in the pipeline or can be forwarded to a port or any particular table in the pipeline thereby bypassing processing of intermediate tables.

The final table in the packet processing pipeline is the group table. The group table consists of group entries. The ability for packets in a particular data flow (i.e. a particular flow) to point to a group enables OpenFlow to represent additional methods of forwarding the packets of that flow (e.g. select, all, fast failover, and similar actions). There are Action Buckets associated with a group table entry, where each action bucket contains a set of actions to execute. The group table entry determines which Action Bucket to execute, where the possible actions are similar to those defined in the flow tables.

The de-coupled control platform of the split architecture eases the task of modifying the network control logic and provides a programmatic interface upon which developers can build a wide variety of new protocols and management applications. In this model, the data and control planes can evolve and scale independently, while the cost of the data plane elements is reduced.

Network Element Architecture

Figure 2:
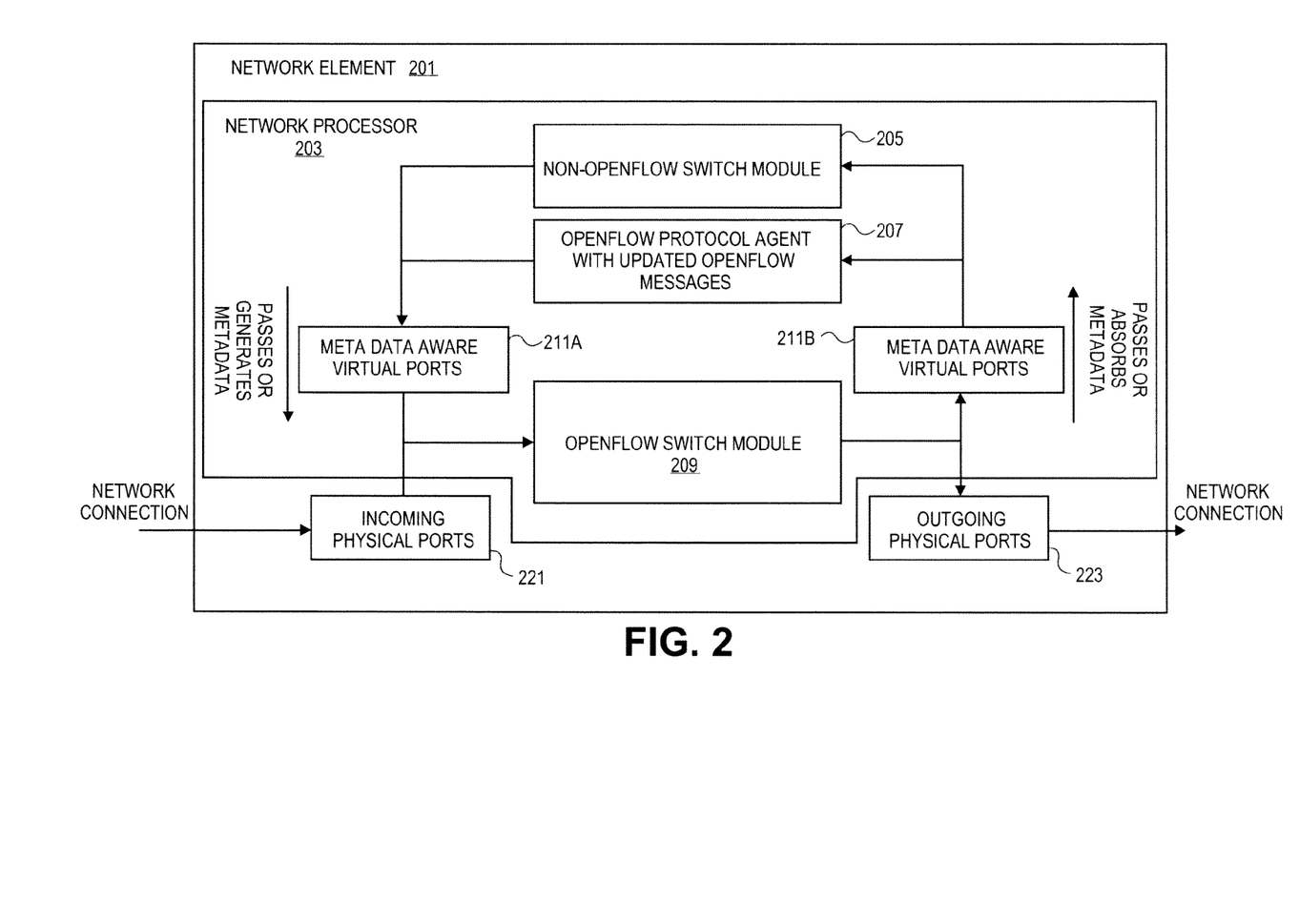
FIG. 2 is a diagram of one embodiment of a network element executing a generic packet monitoring mechanism and process.

The embodiments of the invention are implemented in a network element such as a router or switch in a wide area network, such as the Internet, or similar network. An example network element is illustrated in FIG. 2. The network element 201 can include a network processor 203 that processes packets received from incoming physical ports 221 and transmitted by the outgoing physical ports 223, which each connect the network element to a network or set of networks. A 'set,' as used herein refers to any positive whole number of items including one item.

The incoming physical ports 221 and outgoing physical ports 223 manage physical and link level data processing. The incoming physical ports 221 handle incoming data traffic at the physical and link level by framing or similarly processing the incoming signal and providing this data to the network processor 203 for further processing. Similarly, the outgoing physical ports 223 handle outgoing data traffic at the physical and link level by deframing or similar processing to transmit it to other devices over a connected network. These two sets of ports function together to enable communication with any number of other devices over a network using any number or combination of links.

The network processor 203 can include a set of switch modules, virtual ports and protocol agents amongst other components. Those components relevant to understanding the OpenFlow OAM process are illustrated and discussed while other components are omitted for sake of clarity. The switch modules can include non-OpenFlow switch modules 205 and OpenFlow switch modules 209. Non-OpenFlow switch modules 205 can be any number of modules dedicated to processing the forwarding and handling of data packets, including e.g., the creation or termination of OAM frames. The OpenFlow switch module 209 is described herein in further detail in regard to FIGS. 3A and 3B. The OpenFlow switch module 209 implements the flow table and manages the forwarding and processing of all OpenFlow data packets.

The OpenFlow protocol agent 207 manages the communication between the network element 201 and the controller. The OpenFlow protocol agent 207 processes the OpenFlow control messages received from the OpenFlow controller and generates OpenFlow messages to the controller as needed. The OpenFlow protocol agent 207 can include support for receiving configuration messages to insert OAM packets into a data flow and can include support for sending received OAM packets to the OpenFlow controller for processing.

In one embodiment, the virtual ports 211A and 211B can optionally provide a pre-processing of OAM packets received by the network element 201. OAM packets can be directed to these virtual ports to process and update the meta data of these OAM packets. In one embodiment, OAM packets can be directed to these virtual ports by sources of the OAM packets in which case the meta data of the OAM packets is updated by the port as directed by the source to ensure proper forwarding or processing by the OpenFlow switch module.

In another embodiment, the virtual ports 211A and 211B modify or update the meta data in a manner specific to that virtual port. In this embodiment, the sources of the OAM packets direct the OAM packets to the virtual ports so that they will be processed in the manner known for that virtual port.

Packet Identification

The embodiments of the invention describe a generic configuration method for identifying certain packets of an OpenFlow data flow in an OpenFlow switch, which allows the identification of those packets and ensures the fate sharing with packets belonging to the data flow.

To identify specific packets, such as OAM packets in an OpenFlow data flow, the embodiments of the invention utilize fields in the OpenFlow data packets that are not utilized during matching (i.e., not considered when determining how a data packet is to be forwarded across a network). Such fields are referred to as wildcard or wildcarded fields. These fields can be used to distinguish a certain packet from the other data packets in a data flow by an OpenFlow switch. Any number or combination of these fields of the OpenFlow packets can be selected as a matching field so long as they are not taken into account in identifying the data flow or for making forwarding decisions. The value used to identify the OAM packets when placed in the selected matching field's domain can be any value that is not used by any valid data packet.

Figure 4:
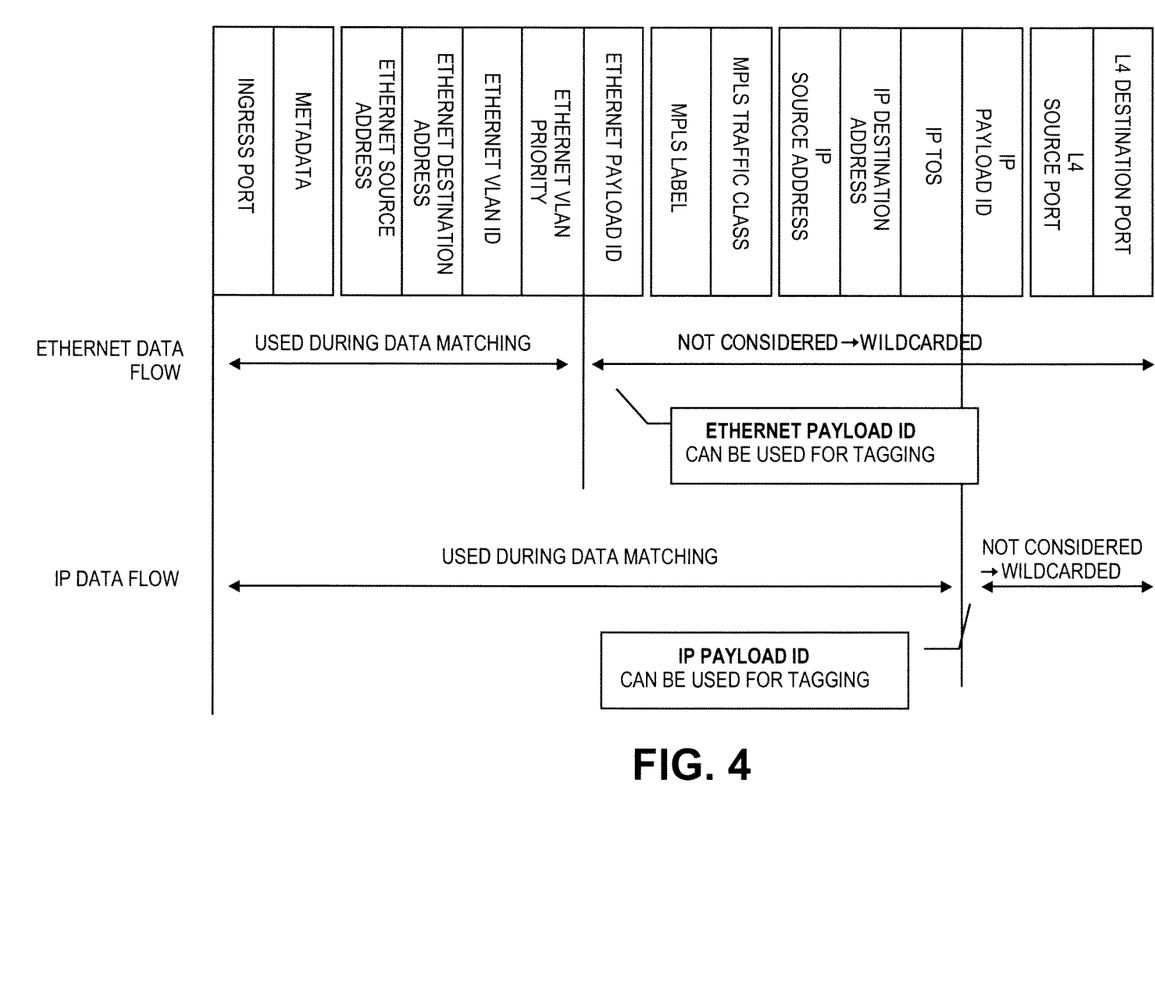
FIG. 4 is a diagram of a Openflow matching structure.

FIG. 4 is a diagram of an example OpenFlow matching structure encompassing a data packet or data frame. In the illustrated example wildcard sections and fields can be used to identifying certain packets (referred to as tagged packets) in the example cases of an Ethernet and/or an IP flow. Note these examples do not preclude the use of other fields, for example priority fields can be also used for tagging.

Packet Injection

In one embodiment, any OpenFlow switch that is directed by its OpenFlow controller or other source to inject packets (referred to as tagged packets) such as OAM packets into a data flow is dealing with packets to be injected that are generated by an entity (i.e., source) that may not be a part of the OpenFlow forwarding mechanism. Such an entity can be for instance an external OAM module attached to the switch (e.g., a non-OpenFlow switch module 205) or the OpenFlow controller. The tagged packets generated by such entities can be received by the OpenFlow switch module through virtual ports. In one embodiment, any packets entering the OpenFlow switch module through a physical or virtual port must be sent through the whole packet processing pipeline.

Figure 3A:
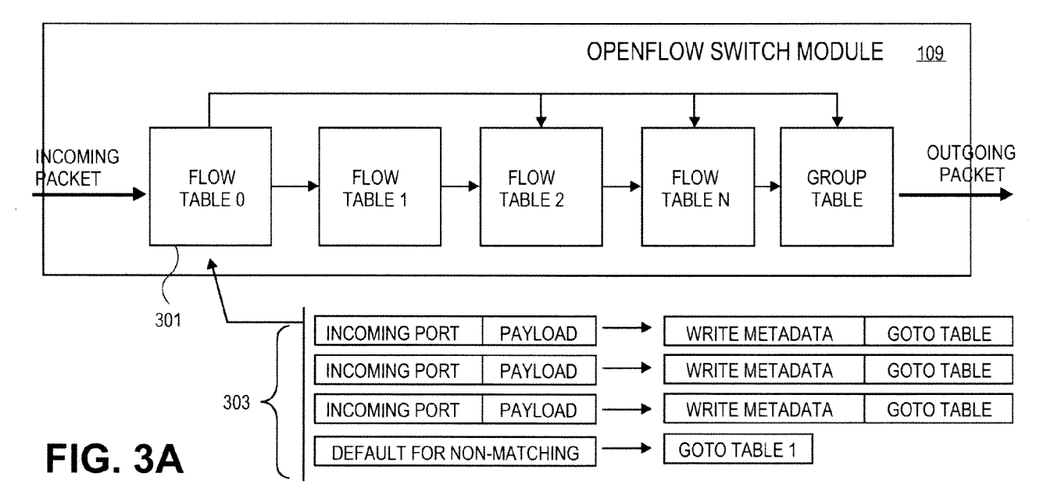
FIG. 3A is a diagram of a first embodiment of an OpenFlow switch module.
Figure 3B:
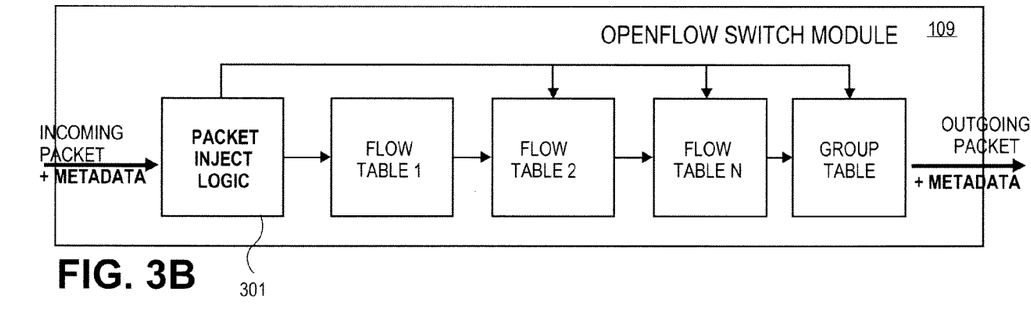
FIG. 3B is a diagram of a second embodiment of an OpenFlow switch module.

FIGS. 3A and 3B are diagrams of two example embodiments of the processing, injection and detecting of the OpenFlow OAM packets in an OpenFlow switch module. The processes implemented by these example OpenFlow switch modules each start with the initial processing of the data flows at the first flow table. In one example configuration illustrated in FIG. 3A, the data packets of different smaller flows can be aggregated into a common larger flow. A flow entry will be defined in the flow tables for each smaller flow; the actions of these entries will direct the update of the data packets to fit them into the new aggregated flow. A second flow entry can be deployed in a subsequent table that will describe the common flow.

The example embodiments of the invention adds a new module, the Packet Inject Logic (PIL) 301, to the OpenFlow switch module 109 and places it in front of the packet processing pipeline. The PIL 301 checks the meta data associated with each received data packet or the content of the data packet to determine whether to send the data packet through the default processing pipeline starting with the first table after the PIL 301 or to insert the data packet into a subsequent flow table in the pipeline. In this latter case the PIL 301 can also define meta data (i.e., write meta data to the data packet) that can be considered during matching in the subsequent tables.

In the first example embodiment in FIG. 3A, the PIL 301 utilizes the extensible matching capability of OpenFlow 1.1 to implement a PIL analysis based data packet handling process. The PIL module 301 is implemented by the first flow table and the other flow tables are shifted to the next subsequent flow table. For instance the first flow table is actually implemented by the second flow table, and so on. The matching performed by each flow table examines the meta data provided together with the packet data and/or the header fields of the data packet can be considered. In this latter case, a new matching type can be defined if the standard matching types cannot match on the desired packet fields. In this example PIL analysis embodiment, the new PIL matching table 303 lists all packets that should be inserted into later pipeline stages while the default action for that table (i.e., what to do with non-matching packets) is to send these non-matching packets to the next table.

In the second example embodiment illustrated in FIG. 3B, the PIL module 301 implements a meta data directed data packet handling process. The PIL module 301 receives the meta data passed together with the data packet, where this meta data explicitly determines at what pipeline stage the packet must be included into the common data flow. In this embodiment, the PIL module 301 reads the meta data of each data packet and passes the data packet to the proper flow table or to the group table to join the data packet to the common flow. In this example meta data directed packet handling embodiment, the meta data or packet data can include any number of attributes such as an attribute that is (1) the identifier of the flow table (0-255 according to OpenFlow 1.1) to which the data packet is to be forwarded. In the case when the packet is sent directly to the Group Table, then the attribute can be (2) the table ID set to a value out of the flow table id domain (e.g., 256 in case of OpenFlow 1.1). Other attributes can include (3) the Group ID where the table ID can be set to the Group Table constant otherwise it may not be considered) and other (4) meta data to be used during matching.

To realize the first example PIL analysis based embodiment illustrated in FIG. 3A, the content of the OpenFlow OAM packets (tagged packets) is utilized (i.e., used for matching) to determine how the OAM packet is to be handled. In the case of OAM packets, the content of the OAM packet must be checked (for instance MEP IDs) to select the appropriate table or group. To match on these fields the OpenFlow switch module can implement a new matching type. Furthermore, these new matching types are specific to the type of the tagged packet. In some limited scenarios, the current switch implementation can support the packet injection without any significant hardware updates. Rather, the functionality described herein can be partly or wholly implemented in software configuration by configuring the OpenFlow switch module 109 to shift the standard flow table processing and insert the PIL into the first flow table.

In the second meta data directed implementation illustrated in FIG. 3B, extensions to the OpenFlow switch module 109 are necessary. However, these extensions are not solution specific. Since the decision on what to do with the packet is actually determined by a module external to the OpenFlow switch module the changes to the OpenFlow switch module to include the PIL module 301 can be generic to all scenarios.

In regard to the OpenFlow switch module 109 configuration, the first PIL analysis based embodiment of FIG. 3A requires continually maintaining and configuring the first table (i.e., the PIL module 301). To insert a new class of tagged packet in PIL module 301, the first table must be extended with appropriate flow rules to match and handle the new class of tagged packet. In the second meta data directed implementation of FIG. 3B, there is no need to do continual configuration management.

Virtual Ports

Both implementations illustrated in FIGS. 3A and 3B assume that some information is provided and attached as meta data to the data packet being processed by the PLI, where this meta data is provided or attached by the physical or virtual port from which the data packet is received by the OpenFlow switch module. In one embodiment, the physical and or virtual ports are extended such that the ports shall be able to pass meta data along with the data packet to the OpenFlow switch module and the PIL in the OpenFlow switch model is be able to interpret the received meta data during packet processing. Depending on the source of such information placed into the meta data by the physical port or virtual port two alternative embodiments are differentiated an external source embodiment and an internal definition embodiment.

In an external source embodiment, the meta data is generated by the source of the packet, e.g., the OpenFlow controller. In this case a virtual port copies the meta data provided by the source into the meta data of the data packet to be passed to the OpenFlow switch module. This external source embodiment does not require any configuration updates of existing OpenFlow virtual port configuration procedures.

In the internal definition embodiment, the meta data for a data packet is generated by the virtual port itself. In this embodiment, the granularity of the definition of the meta data is tied to the receiving virtual port, i.e., all packets from the same virtual port will be treated in the same way; each of the data packets will be given the same meta data and as a result will be injected by the PIL into the same stage of the pipeline. The configuration of these virtual ports can be a specialized process or protocol managed by the OpenFlow controller.

In regard to the handling of OAM packets, the OpenFlow controller is one source of the OAM (tagged) packets. For instance the OpenFlow controller may want to check whether an OpenFlow data flow is configured appropriately. If the system utilizes the meta data directed packet handling embodiment, then the source of the data packet must provide the meta data, as well. To make the OpenFlow controller fulfill this requirement, the OpenFlow protocol can be extended as described herein below.

OpenFlow Message Option for Controller Generated Tagged Packets

Figure 5:
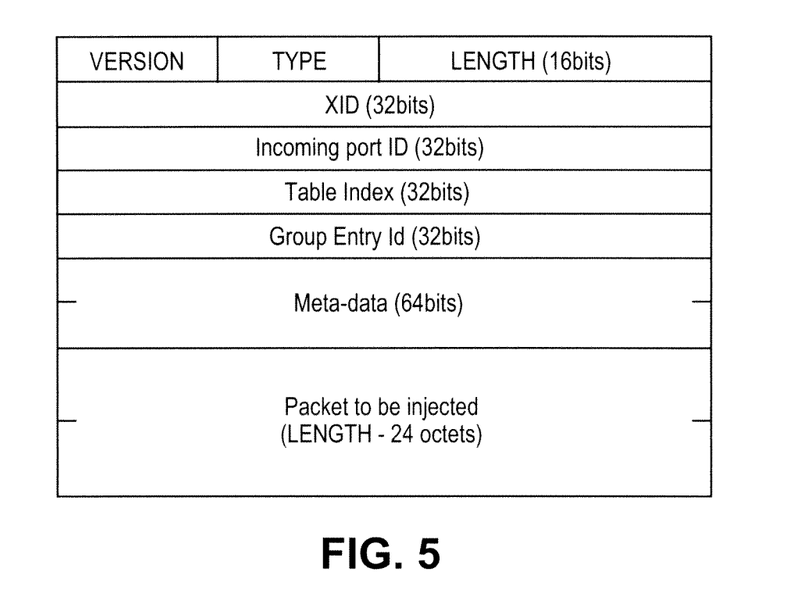
FIG. 5 is a diagram of one embodiment of a controller to switch OpenFlow message format

A new OpenFlow message option defines a new OpenFlow controller-to-switch message comprising the following fields: (1) a common OpenFlow header, which encodes the OpenFlow protocol version, the type and the length of the message and a transaction identifier; (2) an identifier of the incoming port, which is considered during matching as in_port; (3) a start table index, where the packet is injected, which can be set either to a valid table index or to a GROUP_TABLE constant; (4) a group identifier, which is valid if a start table index is set to a GROUP_TABLE constant, otherwise, it must be set to 0 by the controller and must be ignored by the switch; (5) meta data to be used during matching and (6) the OAM packet to be inserted. An example layout of this message is illustrated in FIG. 5.

The GROUP_TABLE constant must be outside of the valid flow table indexed to avoid collision. In OpenFlow 1.1, the flow tables are indexed from 0 to 255. So the GROUP_TABLE can be any value larger than 255.

OpenFlow Action Option for Controller Generated Tagged Packets

Figure 6:
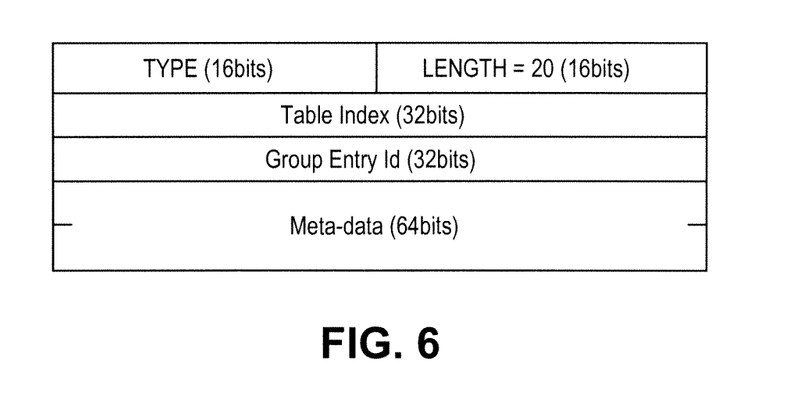
FIG. 6 is a diagram of one embodiment of an injection action format.

The embodiments of the invention define a new action for use in implementing the monitoring of OpenFlow flows and other OAM function. This action option can make use of the existing Packet Out message specified by the OpenFlow 1.1 standard. According to the standard, the Packet Out message can instruct the OpenFlow switch to send a packet through the processing pipeline by including an OFPAT_OUTPUT command where the out port is set to OFPP_TABLE virtual port. However, the command only expresses that the packet must be sent through the pipeline but does not enable specifying at which stage in the processing pipeline of the OpenFlow switch module to insert it. This embodiment defines a new action that is referred to herein as an OFPAT_INJECT_PACKET, which comprises the following fields: (1) a table index encoding the flow table index or an indicator that the group table is to be utilized (through GROUP TABLE constant); (2) a group entry identifier identifying a group table entry if the table index is set to the GROUP_TABLE constant, otherwise this value is set to null and must be ignored by the PIL of the OpenFlow switch module; and (3) a meta data field to be used during packet processing (i.e., matching) in the processing pipeline. An example layout of the action is illustrated in FIG. 6.

To inject a tagged packet (e.g., an OAM packet) into the processing pipeline by the controller, the Packet Out message can include an OFPAT_INJECT_PACKET action in its action field and not an OFPAT_OUTPUT action.

Figure 7A:
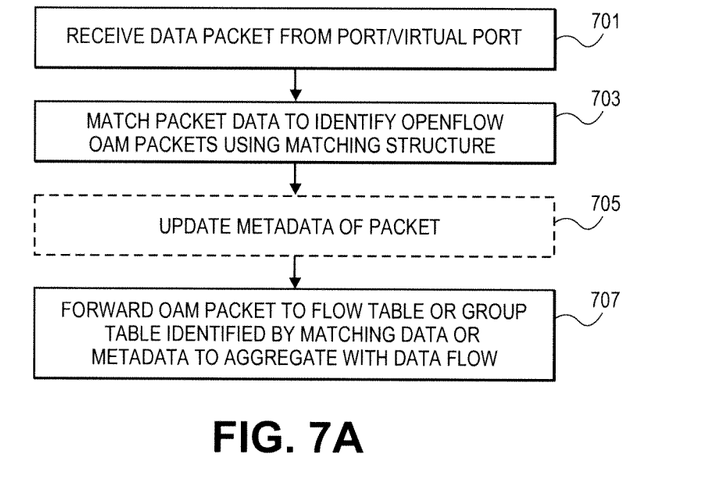
FIG. 7A is a flowchart of one embodiment of a process for inserting an OpenFlow OAM packet by the OpenFlow switch module.
Figure 7B:
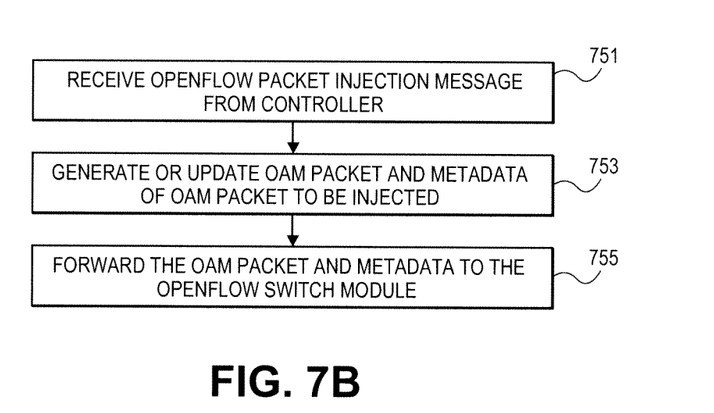
FIG. 7B is a flowchart of one embodiment of a process for preparing an OpenFlow OAM packet by a virtual port of the network element.

FIGS. 7A and 7B are flowcharts of one embodiment of the processes of the PIL module and the virtual port, respectively, implementing the packet injection process and system described herein above. In regard to the PIL module, the process as illustrated in FIG. 7A, is initiated in response to receiving a data packet from the physical or virtual port (Block 701). The PIL module examines each incoming packet by using either the PIL analysis based packet handling or meta data directed packet handling. In either case the PIL matches packet data to identify packets for monitoring data flows such as OAM packets and to determine which of the packet processing pipeline stages to forward the data packet to implement the insertion of the data packet into the common data flow (Block 703). In the PIL analysis based process, the PIL module identifies the pipeline stage based on matching rules that can include any field of the data packet, the entire matching structure as described above or any combination or sub-combination thereof. The matching includes a match on the packet including a tag identifying the data packet as an OAM packet or similar packet for monitoring data flows. In the meta data directed analysis, the matching rule identifies the OAM packets based on the tag, but then primarily identifies the pipeline stage for forwarding based on the meta data identification of the stage that has been defined by the port through which the OpenFlow switch received the data packet. Data packets that are not tagged are forwarded to a default pipeline stage, which is typically the next stage in the pipeline.

In some embodiments, before forwarding the data packet to the determined pipeline stage, an action of the PIL module correlated with the matching rule can be executed to update the meta data of the data packet (Block 705). The update of the meta data can influence the processing of the data packet in the pipeline stage to which it is being forwarded. After the meta data is updated the data packet is then forwarded to the identified pipeline stage (i.e., a flow table or group table) (Block 707).

FIG. 7B is a flowchart of the process of processing packets at the virtual port. In one embodiment, the process is initiated in response to receiving an OpenFlow packet injection message from a controller or a similar source of a data packet to be inserted into a data flow (Block 751). The virtual port can process each data packet using either an external source based process or an internal definition process. In either case, the virtual port can generate a data packet to be inserted into a data flow as directed by the incoming message from the OpenFlow controller and define meta data for the data packets to be sent to the OpenFlow switch module (Block 753). The meta data can be determined based on information defined in the incoming message (external source based process) or can be determined by the virtual port that the message is directed to (internal definition process). After the data packet and meta data have been generated based on the external source based process or the internal definition process, then the data packet and meta data are forwarded to the OpenFlow switch module (Block 755).

Tagged Packet De-Multiplexing Process

The de-multiplexing or removal and processing method is a process implemented in a destination or egress OpenFlow switch. The de-multiplexing process enables the monitoring of the OpenFlow data flow along its path up to the destination OpenFlow switch. Any supporting OpenFlow switch that identifies the monitored data packets, such as OAM packets, is referred to herein as an egress OpenFlow switch. At the egress OpenFlow switch two flow table entries can be defined: (1) first flow table entry defines criteria for identifying the tagged data packets and defines their treatment, and (2) a second flow table entry defines the treatment of the other data packets. The treatment of the tagged packets can be encoded by either a specific OpenFlow action or can be expressed by sending the tagged packet to a well defined virtual port. In this latter case, the sending of the tagged packet to a virtual port either triggers an OpenFlow control message that encodes information related to the tagged packet, or relays the tagged packet to an specific switch module. The control message with the encoded information is sent to the OpenFlow controller to enable OAM functions. The two alternative processes for handling the tagged packets are further discussed below.

Switch Local Termination Process

In this embodiment of de-multiplexing the tagged data packets, the tagged data packets or frames are forwarded to a non-OpenFlow switch module, which is separate from the OpenFlow switch module and pipeline process. The non-OpenFlow switch module and the OpenFlow switch module can communicate with each other through a virtual port. The non-OpenFlow switch module can pass meta data to the OpenFlow switch module. This switch local termination process specifies that the OpenFlow switch module is able to pass meta data through the virtual port to the other switch modules. If no non-OpenFlow switch module that is able to process the meta data is available, then the virtual port is able to suppress the meta data, i.e., drop it without processing it.

Controller Targeted Process

In this embodiment of de-multiplexing the tagged data packets, the tagged data packets are relayed (i.e., forwarded) to the controller. The Packet In message can be used to implement this feature without any modification. However, the Packet In message does not pass all meta data of a data packet to the controller, as the message carries only the incoming port (physical and/or virtual) and the table ID. Therefore the following additional fields to the Packet In message are defined to support this controller targeted process by adding: (1) a GROUP/FLOW TABLE selection flag indicating the data packet is received after processing by a flow table or by the group table. If this GROUP/FLOWTABLE flag is set to 0, then the table_id field carries the index of the flow table. Otherwise, the table_id must be set to 0 by the PIL of the OpenFlow switch module and should be omitted during processing by the controller; (2) a metadata field, carrying the value of the meta data field used during packet processing; (3) a Group ID field that defines the identifier of the executed group table entry. It carries valid information if the GROUP/FLOW TABLE selection flag is set to 1. Otherwise, this field must be set to 0 and should be ignored by the controller.

Figure 8:
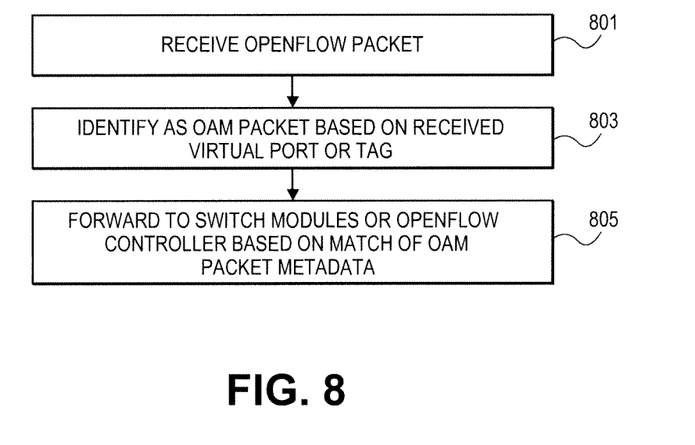
FIG. 8 is a flowchart of one embodiment of a process for de-multiplexing

FIG. 8 is a flowchart of one embodiment of the de-multiplexing process. In one embodiment, the process is initiated in response to receiving an OpenFlow data packet at an OpenFlow switch module (Block 801). The data packet is initially processed by the PIL module to match on the identity of the packet as a monitored (e.g., OAM packet) by checking a designated field of the data packet for a designated value that identifies the packet as a monitored data packet (Block 803). The header or meta data of the received packet can be used for identifying the packet as a monitored packet, an entire matching structure or any combination thereof can also be utilized. In one embodiment, a virtual port that received the data packet can modify the meta data to identify the data packet as a monitored data packet. As a separate or combined step, the data packet can be matched to determine whether the data packet is to be forwarded to a non-OpenFlow switch module or to an OpenFlow controller (Block 805). This can be encoded in the meta data or header of the data packet. The data packet can be forwarded to the non-OpenFlow switch module to be processed when for example the data packet is an OAM packet generated and monitored by an OAM module separate from the OpenFlow controller. The data packet can be sent to the OpenFlow controller using a control message to provide the entire data packet including the meta data when for example the data packet is an OAM packet and the OAM module is a part of the OpenFlow controller.

Example 1

Ethernet Packet Flow

This section gives an example use of an embodiment of the invention as applied to frame identification, and configuring frame injection and de-multiplexing of OAM frames for an Ethernet flow.

Identification

In the first example Ethernet flows are deployed, i.e., only the Ethernet header fields are utilized for matching and handling the data packets, including the source and destination MAC address, and VLAN tag fields. There are no restrictions on the payload of the Ethernet packet.

The DL_TYPE of the matching structure, which defines the Ethertype field of an Ethernet packet, will be wildcarded. According to this example embodiment of the invention, this DL_TYPE field is selected to distinguish data packets. To select an appropriate value from the available domain (16-bits), one non-allocated Ethertype value can be selected. For example, a value can be selected that does not collide with the allocated Ethertype values defined by IANA.

At the ingress side of the monitored flow, the following configuration is set. Only a single matching table is used. To inject the OAM frames, the packet headers are the same as for the service packets, except the Ethertype, which is set to OAM (e.g. 0xD001). The matching rule is configured as: the Ethernet dst is the real destination address, while all other fields are wildcarded. The action is to send to the next table or output port.

At the egress side, a single table is used with two flow entries. The first flow entry is for the OAM traffic. Matching is set as: Ethernet dst=the real destination address, Ethertype=OAM (e.g. 0xD001), all other fields are wildcarded. Rule priority=101. Action=send to OAM port.

The second flow entry is for the service traffic. Matching is: Ethernet dst=real destination address, all other fields are wildcarded. Rule priority=100. Action=send to next table or output port.

Example 2

MPLS Packet Flow

This section gives an example use of an embodiment of the invention on frame identification, and on configuring frame injection and de-multiplexing of OAM frames for an MPLS flow.

Identification

In the second example MPLS flows are considered and the following flow matching entries are used during forwarding. The Ethernet fields may or may not be set, but Ethertype is set to either 8847h or 8848h. The MPLS label matching field is set to a valid label value (between 16 and 1048576). All other matching fields will not be considered during matching according to the OpenFlow 1.1 standard. Then a second label is used for packet exceptions. The OAM packets can be identified e.g. by setting the second label with a value from 0-15 that is not specified by other standards.

At the ingress side, a single table is used with one flow entry. To inject the OAM frames, the packet headers are the same as for the service packets, except an additional MPLS header is used, with the OAM (e.g. 10) label. The flow table entry is configured as matching: Ethertype=0X8847, MPLS=given_label, all other fields are wildcarded. Action=push given_label and send to next table or output port.

At the egress side, two tables are used. The first table contains a single flow entry, for both the monitored and the monitoring packets. The matching is set to the given_label, all other fields are wildcarded. The action is to remove the label and goto the second table. The second table contains two entries. The first one is for the monitoring packet, with a matching Ethertype=0x8847, MPLS=OAM (e.g. 10), all other fields are wildcarded. Priority: 101. Action: send to OAM port. The second entry is for the monitored traffic, with matching set to Metadata=given label, all other fields are wildcarded. Priority=100. Action=send to next table or output port.

Example 3

IP Packet Flow

This section gives an example use of an embodiment the invention for frame identification, configuring frame injection and injection of OAM frames into an IPv4 flow.

Identification

In the case of an IP flow, the Ethernet fields may or may not be set, but the Ethertype is set to 0800h. The IP header fields are considered, like source and destination IP address and there are no restrictions on the payload of the IP packet. Then the Protocol of the IP matching structure, which reflects to the next encapsulated protocol of an IP packet, will be wildcarded. According to one example realization of this invention, this field will be selected to distinguish certain packets.

At the ingress side a single table is used. To inject the OAM frames, the packet headers are the same as for the service packets, except the IPv4_proto field, which is set to a new OAM (e.g. 250) type. The matching of the flow entry is set to EtherTpye=0800, IP destination: given destination address, all other fields=wildcarded. The Action is to send to next table or output port.

At the egress side one tables is used, with two entries. The first flow entry is for the OAM traffic. Matching is: Ethertype=0800, IP destination: given destination address, IPv4_proto: OAM (e.g. 250), all other fields are wildcarded. Rule priority=101. Action=send to OAM port. The second flow entry is for the service traffic. Matching is: EtherTpye=0800, IP destination=given destination address, all other fields are wildcarded. Rule priority=100. Action=send to next table or output port.

The embodiments of the invention, describe an extension to the OpenFlow switch operation that allows the injection and de-multiplexing of certain data packets (tagged frames) into and/or from a data packet flow. Such configuration changes affect only the data switches involved in the data injection or removal processes and does not necessitate any configuration changes to any intermediate nodes. Thus, in any intermediate node the same forwarding entry will be applied on both the regular data packets and the tagged frames. This feature ensures fate sharing for data packets inserted and monitored in a data flow.

The embodiments of the invention, enable easy and flexible deployment of OAM tools in an OpenFlow domain as they provide not only fate sharing for monitored data packets, but the embodiments also present mechanisms to forward the OAM packet to/from the monitoring points, regardless of whether the mechanisms are implemented at the switch or at the controller.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method implemented by a network element to monitor OpenFlow data flows and enable operations, administration and management (OAM) functionality in OpenFlow, the method to insert OpenFlow OAM packets into an OpenFlow data flow to monitor the OpenFlow data flow, wherein inserted OpenFlow OAM packets have fate sharing with data packets in the OpenFlow data flow, the method comprising the steps of:
   receiving by the network element the OpenFlow OAM packets from a source through a port of the network element;
   matching by an OpenFlow switch module using a matching structure of OpenFlow data packets received by the network element to identify the OpenFlow OAM packets;
   identifying, based on matching packet data or meta data, a flow table or group table of a packet processing pipeline within the OpenFlow switch module to which to forward the identified OpenFlow OAM packets so that the identified OpenFlow OAM packets are inserted into a corresponding OpenFlow data flow; and
   forwarding the identified OpenFlow OAM packets to the identified flow table or group table of the OpenFlow switch module to insert the OpenFlow OAM packets into the corresponding OpenFlow data flow whereby the identified OpenFlow OAM packets are processed and forwarded by the flow table or group table in a same manner as the data packets in the corresponding OpenFlow data flow.

2. The method of claim 1, further comprising the step of:
   updating meta data of the OpenFlow OAM packet by a virtual port of the network element using meta data defined by the source.

3. The method of claim 1, further comprising the step of:
   updating meta data of the OpenFlow OAM packet by a virtual port of the network element using meta data defined by the virtual port.

4. The method of claim 1, wherein the OpenFlow OAM packets are received with an OpenFlow packet injection message defining an inject packet action, the method further comprising the step of:
   executing the inject packet action by the OpenFlow switch module to inject the OpenFlow OAM packet into the OpenFlow data flow.

5. The method of claim 1, wherein the network element de-multiplexes the OpenFlow OAM packets with an egress method comprising the step of:
   forwarding, by the OpenFlow switch module, the OpenFlow OAM packets to a switch module of the network element for OAM processing.

6. The method of claim 1, wherein the network element de-multiplexes the OpenFlow OAM packets with an egress method comprising the step of:
   forwarding, by the OpenFlow switch module, the OpenFlow OAM packets to an OpenFlow controller using an OpenFlow control message.

7. A network element to monitor OpenFlow data flows and enable operations, administration and management (OAM) functionality in OpenFlow, the network element to insert OpenFlow OAM packets into an OpenFlow data flow to monitor the OpenFlow data flow, wherein inserted OpenFlow OAM packets have fate sharing with data packets in the OpenFlow data flow, the network element comprising:
   an incoming physical port to receive OpenFlow OAM packets from a source node over a first network connection;
   an outgoing physical port to transmit OpenFlow data packets to a destination node over a second network connection;
   a network processor connected to the incoming physical port and the outgoing physical port, the network processor executing an OpenFlow switch module, the OpenFlow switch module to match a matching structure in OpenFlow data packets to identify the OpenFlow OAM packets, to identify, based on matching packet data or meta data, a flow table or group table of a packet processing pipeline within the OpenFlow switch module to which to forward the identified OpenFlow OAM packets such that the identified OpenFlow OAM packets are inserted into a corresponding OpenFlow data flow, to forward the identified OpenFlow OAM packets to the identified flow table or group table of the OpenFlow switch module to insert the OpenFlow OAM packets into the corresponding OpenFlow data flow, and to forward the OpenFlow data flow to the destination node through the outgoing physical port, whereby the identified OpenFlow OAM packets are processed and forwarded by the flow table or group table in a same manner as the data packets in the corresponding OpenFlow data flow.

8. The network element of claim 7, further comprising:
a virtual port executed by the network processor to update meta data of the OpenFlow OAM packet using meta data defined by the source.

9. The network element of claim 7, further comprising:
a virtual port executed by the network processor to update meta data of the OpenFlow OAM packet using meta data defined by the virtual port.

10. The network element of claim 7, the OpenFlow OAM packets are received with an OpenFlow packet injection message defining an inject packet action, the OpenFlow switch module executes the inject packet action to inject the OpenFlow OAM packet into the OpenFlow data flow.

11. The network element of claim 7, wherein the OpenFlow switch module de-multiplexes the OpenFlow OAM packets with an egress method that forwards the OpenFlow OAM packets to a switch module of the network element for OAM processing.

12. The network element of claim 7, wherein the OpenFlow switch module de-multiplexes the OpenFlow OAM packets with an egress method forwards the OpenFlow OAM packets to an OpenFlow controller using an OpenFlow control message.

* * * * *

UNITED STATES PATENT AND TRADEMARK OFFICE
CERTIFICATE OF CORRECTION

| | | |
|---|---|---|
| PATENT NO. | : 8,964,569 B2 | Page 1 of 1 |
| APPLICATION NO. | : 13/275149 | |
| DATED | : February 24, 2015 | |
| INVENTOR(S) | : Jocha et al. | |

It is certified that error appears in the above-identified patent and that said Letters Patent is hereby corrected as shown below:

In the specification

In Column 4, Line 7, delete "art. The embodiments of the invention." and insert -- art. --, therefor.

Signed and Sealed this
Fifteenth Day of December, 2015

Michelle K. Lee
*Director of the United States Patent and Trademark Office*